W. L. HUBBELL.
Whiffletree.

No. {2,738. / 33,742.}

Patented Nov. 19, 1861.

Witnesses:
Lemuel W. Serrell
Thos. Geo. Harold

Inventor:
Wm. L. Hubbell

UNITED STATES PATENT OFFICE.

WILLIAM L. HUBBELL, OF BROOKLYN, NEW YORK.

IMPROVED MEANS OF ATTACHING TRACES TO CARRIAGES.

Specification forming part of Letters Patent No. 33,742, dated November 19, 1861.

*To all whom it may concern:*

Be it known that I, WILLIAM L. HUBBELL, of Brooklyn, in the county of Kings and State of New York, have invented, made, and applied to use a certain new and Improved Means for Attaching Traces to Whiffletrees; and I do hereby declare that the following is a full, clear, and exact description of my said invention, reference being had to the annexed drawings, making part of this specification, wherein—

Figure 2:
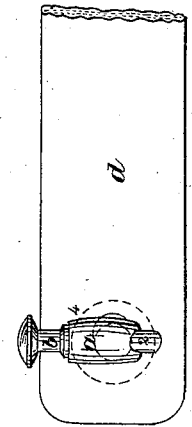
Figure 1:
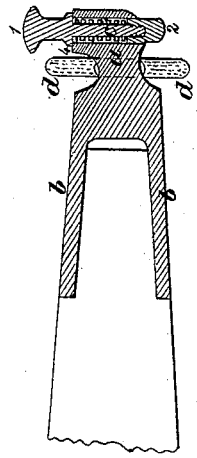

Figure 1 is a vertical section, and Fig. 2 is an end view, of my improvement.

Similar marks of reference indicate the same parts.

Hooks, cockeyes, spring-eyes, and a variety of devices have heretofore been used at the ends of whiffletrees for attaching the traces. All, however, are more or less inconvenient and are liable to injury at the same time that they are not adapted to finely-finished carriages, their appearance being unsightly. Some of the devices heretofore made are not only liable to become injured from concussion, but are liable to open and allow the trace to slip off.

The nature of my said invention consists in a cross-bolt through the eye on the whiffletree, fitted in such a manner as to allow the trace to be passed easily over the same in attaching or detaching the trace by giving end motion to the said bolt, and when in place the trace is firmly held by the said bolt running crosswise of the eye at the end of the whiffletree.

In the drawings, $a$ is the eye at the end of the whiffletree, attached thereto by the socket $b$ or by a tang entering the end of the whiffletree.

$c$ is my cross-bolt, formed with the head 1 and projecting point 2 and receiving the coiled spring 3. The eye $a$ extends upward, as at 4, so that there is no possibility of the trace $d$ slipping off the top part of said eye $a$, and the trace is held on the lower side by the point 2.

In attaching or detaching the trace end motion is given to the cross-bolt $c$, which allows the hole near the end of the trace to be passed over the end 1 of the bolt and over or off of the eye $a$.

My device is cheap, neat, durable, effective, and not liable to become injured by concussion or otherwise.

What I claim, and desire to secure by Letters Patent, is—

The cross-bolt $c$, applied to the eye $a$ of the whiffletree, in the manner and for the purposes specified.

In witness whereof I have hereunto set my signature this 1st day of July, 1861.

WM. L. HUBBELL.

Witnesses:
 LEMUEL W. SERRELL,
 THOS. GEO. HAROLD.